(12) United States Patent
Pawellek et al.

(10) Patent No.: US 6,920,846 B2
(45) Date of Patent: Jul. 26, 2005

(54) ELECTRIC COOLANT PUMP HAVING AN INTEGRATED VALVE, AND METHOD FOR CONTROLLING SAID VALVE

(75) Inventors: Franz Pawellek, Lautertal (DE); Andreas Schmidt, Schwarzbach (DE)

(73) Assignee: GPM Geräte-und Pumpenbau GmbH, Merbelsrod (Thür.) (DE)

( * ) Notice: Subject to any disclaimer, the term of this patent is extended or adjusted under 35 U.S.C. 154(b) by 0 days.

(21) Appl. No.: 10/484,039

(22) PCT Filed: Jan. 24, 2003

(86) PCT No.: PCT/EP03/00740

§ 371 (c)(1), (2), (4) Date: Jan. 16, 2004

(87) PCT Pub. No.: WO03/071109

PCT Pub. Date: Aug. 28, 2003

(65) Prior Publication Data

US 2004/0237912 A1 Dec. 2, 2004

(30) Foreign Application Priority Data

Feb. 22, 2002 (DE) .......................... 102 07 653

(51) Int. Cl.⁷ ................................ F01P 5/10
(52) U.S. Cl. ................................ 123/41.44
(58) Field of Search .................... 123/41.44, 41.08, 123/41.09, 41.1, 41.4

(56) References Cited

U.S. PATENT DOCUMENTS

| | | | | | |
|---|---|---|---|---|---|
| 5,036,803 | A | * | 8/1991 | Nolting et al. | 123/41.1 |
| 5,314,007 | A | * | 5/1994 | Christenson | 165/43 |
| 5,950,576 | A | * | 9/1999 | Busato et al. | 123/41.08 |
| 5,975,031 | A | * | 11/1999 | Bartolazzi | 123/41.1 |
| 6,390,031 | B1 | * | 5/2002 | Suzuki et al. | 123/41.1 |

FOREIGN PATENT DOCUMENTS

| | | |
|---|---|---|
| DE | 199 21 421 | 11/2000 |
| EP | 0 434 634 | 6/1991 |
| JP | 1203696 | 8/1989 |

* cited by examiner

*Primary Examiner*—Mahmoud Gimie
(74) *Attorney, Agent, or Firm*—Nath & Associates PLLC; Gregory B. Kang; Derek Richmond

(57) ABSTRACT

The present invention advantageously proposes an electrical coolant pump (1), in particular for the coolant circuit of internal combustion engines for automotive vehicles, comprising a coolant pump motor for driving an impeller (6) through the intermediary of a pump shaft (10), and a valve (36) that is integrated into the pump inlet, wherein for the first time the coolant pump motor constitutes the switching element for the valve (36). Moreover the present invention for the first time specifies a method for controlling the valve (36), wherein the work necessary for switching is afforded by the coolant pump motor and is transmitted to the valve (36), in particular a 3/2-port directional control valve, via the shaft (10) of the pump motor.

18 Claims, 3 Drawing Sheets

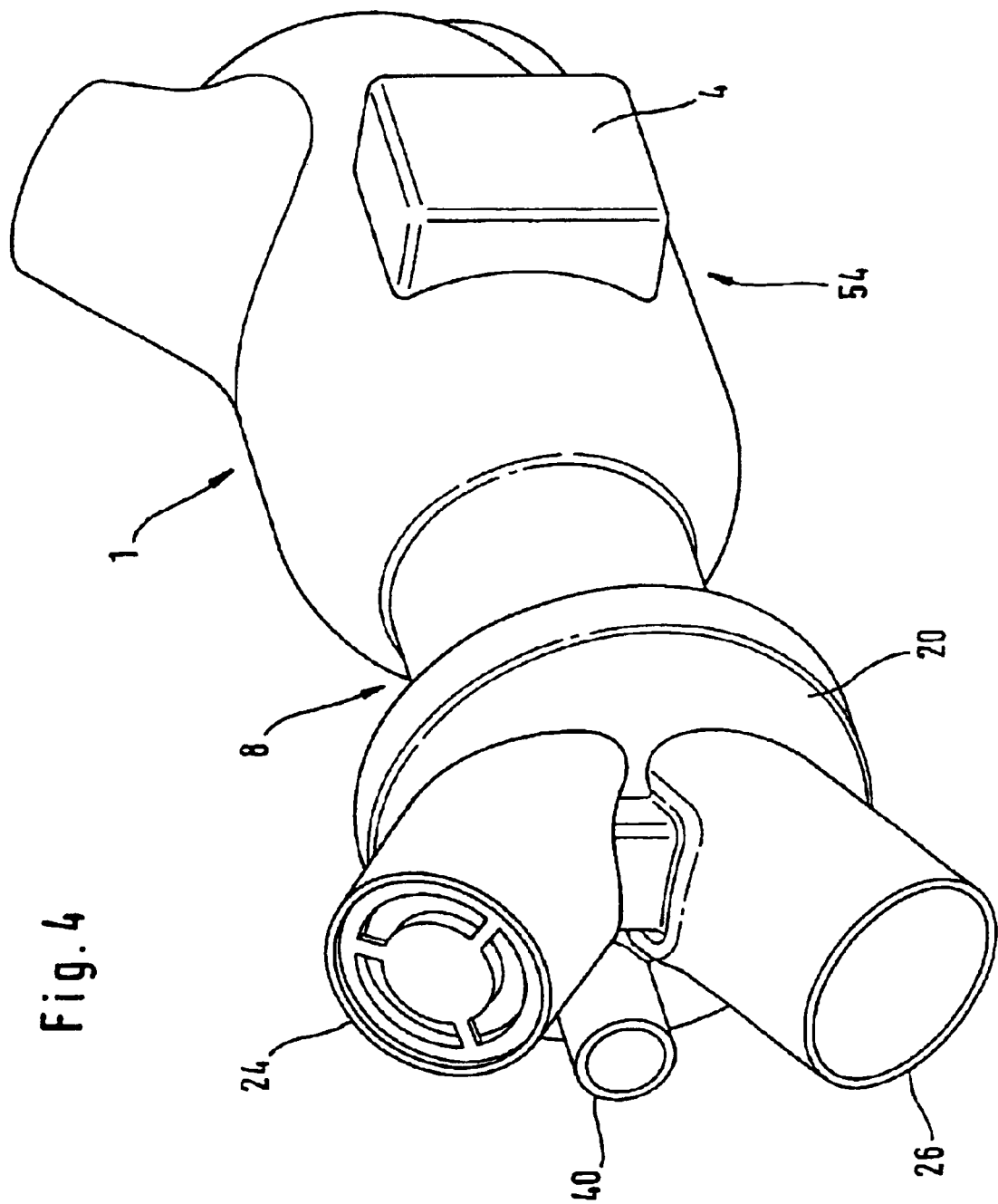

ELECTRIC COOLANT PUMP HAVING AN INTEGRATED VALVE, AND METHOD FOR CONTROLLING SAID VALVE

The present invention relates to an electrical coolant pump, in particular for the coolant circuit of internal combustion engines for automotive vehicles, and a method for controlling a valve of an electrical coolant pump.

Various embodiments of pumps for cooling or heating circuits in automotive vehicles are known to be in practical use.

Thus for example in EP 0 712 744 A1, a circulating pump suited for conveying the coolant is generally discussed in connection with the vehicle heating system that is described there and includes a PCM (i.e., phase-change device). Moreover in DE 198 03 884 A1 a liquid-cooled internal combustion engine having a cooling circuit that includes a coolant pump suited therefor is described.

Electrically powered coolant pumps are increasingly utilized as drive elements for cooling circuits of internal combustion engines for automotive vehicles. In comparison with a pump of a conventional design that is coupled with the engine speed, these have the advantage of being independent of the engine speed and thus also being capable, e.g., of delivering coolant at a standstill. A particularly performing and at the same time extremely compact as well as lightweight design of an electrical coolant pump has been developed by the applicant of the instant application. It is discussed in patent application DE 100 47 387.3 which is as yet unpublished.

Furthermore an electrically operated coolant pump for a cooling or heating circuit in an automotive vehicle has been disclosed, for example, in DE 199 21 421 A1. In the case of this coolant pump, the valve and its housing are jointly arranged on the housing of the pump so as to further reduce the structural space. Here it is a drawback, however, that the valve of DE 199 21 421 A1 is switched via a separate drive mechanism here having the form of an adjusting motor, and in addition requires a control unit of its own. It moreover is a drawback in this design that the coolant is in parts deviated by more than 90° on its way from the inlet via the valve to the coolant pump, resulting in extremely high flow losses. Finally, in this design the valve has to be switched by the separate drive mechanism while subjected to flow loads, so that high switching or actuating forces disadvantageously become necessary.

In view thereof, and in order to avoid the above discussed drawbacks, it is an object of the present invention to propose an electrical coolant pump having a valve that is integrated into the pump inlet, in particular a combination of pump and valve combined in a common housing, which is of a design as compact as possible, has a low weight, and is simplified in terms of control technology. It is another object of the present invention to propose a simplified method for controlling the valve.

In accordance with the invention, there is proposed for the first time an electrical coolant pump, in particular for the coolant circuit of internal combustion engines for automotive vehicles, comprising a coolant pump motor for driving an impeller through the intermediary of a pump shaft, and a valve that is integrated into the pump inlet, wherein for the first time the coolant pump motor constitutes the switching element for the valve.

In other words: The work necessary for switching is afforded by the coolant pump motor and is transmitted to the valve by the shaft of the coolant pump motor. Thus it is for the first time advantageously possible to switch the valve through the intermediary of the coolant pump motor, permitting both a substantial reduction of the number of components to be installed and a decisive economy of space, as well as a surprising simplification in terms of control technology. At the same time a decisive weight reduction is achieved. At the same time, this novel combination of coolant pump and valve moreover provides the possibility of utilizing the electronic control system of the pump for controlling the valve, so that a separate control for the valves may also be done away with.

Here it is advantageously possible through the use of electrical coolant pumps in so-called thermomanagement systems, to do away with the hitherto employed conventional thermostatic valve and replace it with electrically operated valves, for which purpose the present invention for the first time provides the electromotor of the pump as a switching element. The valve actuated in this manner allows for higher control dynamics at reduced flow-through pressure losses.

On the one hand, various practical solutions for separate electrical driving of the valve have been proposed, where in general a rotary valve or an annular slide valve is driven through the intermediary of an electromotor supported by a transmission. These valve elements with separate electrical actuation do, however, constitute a considerable cost factor in the framework of the cooling system and are sophisticated in terms of control technology. In addition to a dedicated actuator and a connecting line to the electrical coolant pump for data equalization, they require a power supply of their own, a control unit of their own, and connection to a data bus system.

In comparison, the inventive combination of coolant pump with integrated valve provides the most compact design possible. Here the drive motor of the pump is for the first time assigned an additional function, namely, the function of "valve actuation." The constructional requirements for housing components, electronics, drive mechanism, etc. are reduced to a smallest possible minimum thanks to the twofold function of the coolant pump motor, namely, both a) as a pump drive and b) for valve actuation.

Thus the valve may advantageously have the form of a 3/2-port directional valve. In this way the most compact design possible is achieved, with the two inlets of the valve being occupied by the respective coolant flows from the bypass and from the radiator, and the only outlet of the valve being routed directly away through the pump housing while flowing around impeller and pump motor. A more compact design can hardly be realized with the technical possibilities available nowadays.

In the inventive combination of coolant pump with integrated valve, the valve having the form of a 3/2-port directional valve replaces the known conventional thermostatic valve. It has the two switching positions of a) "radiator open" or b) "bypass open." It essentially improves the dynamic control behavior and substantially reduces the pressure loss in comparison with thermostatic valves. Through the particularly compact design of this combination, the direct spatial association of the 3/2-port directional control valve with the electrical pump furnishes considerable advantages of installation when arranged in the cooling system of an automotive vehicle. In the inventive combination, the electromotor of the pump for the first time drives the impeller in the one direction of rotation while actuating the valve, preferably via the pump shaft and a free-wheel, in the other one.

In a preferred embodiment, the valve includes a flat disc, preferably a rotary valve element, as a valve member. Such a valve disc or rotary valve element offer the advantage of a place-saving design combined with high functional safety. Moreover a valve disc or a rotary valve element may be mounted and sealed with particularly ease.

In accordance with a further preferred embodiment, the rotary valve element has two positions preferably having the form of lock-in positions. The two switching positions are a) "radiator open" and b) "bypass open." The rotary valve element may, for example, snap into a corresponding recess in the housing encompassing the rotary valve element by means of an integrally formed, springy nose, so that the maintenance of pre-defined switching positions is advantageously ensured in a simple constructive manner.

In accordance with a further preferred embodiment, the rotary valve element is connected with the pump shaft via a free-wheel. The free-wheel prevents transmission of energy to the rotary valve element while the coolant pump motor rotates in the forward running direction. The rotary valve element may thus remain in its current switching position while the pump shaft rotates together with the impeller in accordance with the demanded rotational speed. Moreover this free-wheel permits transmission of energy to the rotary valve element in the reverse rotational direction of the coolant pump motor only. The rotational movement of the coolant pump motor, which in accordance with the invention serves as a switching element for the valve, is thus advantageously made use of for providing the switching movement. A transmission or other reversing mechanisms for power transmission may accordingly be omitted, which in turn results in an advantageous reduction of the number of components.

In a further preferred embodiment of the inventive combination of electrical coolant pump and integrated valve, the valve may be switched, in particular cyclically, by rotation of the rotary valve element through respective angular sections of 180 degrees in the reverse rotational direction of the coolant pump motor. As a result, not only is the rotary movement available from the pump motor advantageously utilized for switching the valve, but at the same time a clear separation of the twofold function of a) pump drive and b) valve actuation is ensured in that the reverse rotational direction is provided for switching the valve, and the forward running direction is provided for conveying the coolant. Thus it is permanently ensured that switching the valve will only take place in the load-free condition. This furnishes the additional advantage of no additional pressure or flow forces acting on the rotary valve performing the function of valve member in the valve. Switching of the rotary valve thus becomes substantially easier. As a result, the valve may advantageously be actuated even by surprisingly low switching forces. The sophisticated separate switching drive mechanisms for the valve known from practical use may thus be suppressed entirely. Moreover no additional auxiliary devices are necessary for discerning the two switching positions of a) "radiator open" or b) "bypass open", for the rotary valve is continuously rotated on in respective cycles of half turns and therefore nevertheless switches back and forth in a cyclically alternating manner between these two switching positions although the direction of rotation, or movement, remains the same. Confusion or erroneous interpretation of the respective switching position is thus excluded. Advantageously it is possible to achieve additional switching safety if the switching position assumed last is stored in a buffer memory for data management.

In accordance with a further preferred embodiment, the rotary valve element includes flow guide means. Hereby it is advantageously possible to adjust an optimized direction of flow—arriving in accordance with the switching position from the bypass or from the radiator—toward the center or longitudinal axis of the coolant pump, so that an optimal flow around the impeller is ensured, and thus a maximum possible throughput is obtained at the lowest possible pressure losses.

In a further preferred embodiment, the 3/2-port directional control valve has in its housing portion another inlet from the heating return which preferably is permanently open. The heating return here is preferably arranged in the housing portion facing away from the pump motor, in the gusset range between the inlet of the bypass and the inlet of the radiator, preferably in a plane through which the longitudinal axis of the pump extends. Hereby it is advantageously ensured that independently of the operating condition of the internal combustion engine of the automotive vehicle, heat may be supplied to the heating circuit for air-conditioning the passenger cabin in the vehicle as early as from the startup process.

In accordance with a further preferred embodiment, the coolant pump control unit is at the same time provided for controlling the valve. This in turn helps save both components and electronic control componentry. In addition a further reduction of the construction space is hereby achieved. At the same time, it is possible to reduce the weight. Cost savings may moreover be realized.

In a further preferred embodiment, the direction of flow of the coolant arriving from the radiator encloses with the coolant pump longitudinal axis an angle of less than 40°, preferably less than 30°. Likewise, the direction of flow of the coolant arriving from the bypass encloses with the coolant pump longitudinal axis an angle of less than 40°, preferably less than 30°. In this way it is advantageously ensured that materializing flow losses are as low as possible. For reasons of fluid technics, as well, the angle between the bypass flange or radiator flange and the pump longitudinal axis should be kept small in order to avoid turbulences, which hereby is advantageously achieved.

In accordance with a further preferred embodiment, the inlet of the bypass of the valve includes an additional valve which is biased, in particular spring-biased. Hereby it is advantageously ensured that for example in the case of a startup process with a correspondingly cold engine, coolant will not yet be circulated through the engine. At the same time, the coolant pump may nevertheless already be operated in this phase, for example in order to initially convey coolant only via the heating circuit, so that the passenger cabin may be heated to comfortable temperatures as rapidly as possible. If in the meantime the operating temperature of the engine has risen to such an extent as to necessitate a first cooling of the engine block, the speed of the pump motor may be raised high enough for the flow rate thus obtained to generate a differential pressure which opens the biased valve in the bypass inlet, so that coolant may be supplied to the engine block via the bypass circuit. If during subsequent operation of the internal combustion engine an even higher cooling performance is demanded, the valve may then be switched over from the switching position "bypass open" to the switching position "radiator open", and a correspondingly higher cooling performance may be provided by way of the radiator. Hereby it is ensured that the engine block will be cooled, or its heat dissipated, neither too late nor too early, not to mention without necessity. Hereby it is ensured that the lubricant or oil of the engine can permanently be kept at an optimal operating temperature, without the occurrence of undesirable heat build-ups or heat losses.

Here for the first time a method is proposed for controlling a valve of an electrical coolant pump, in particular for the coolant circuit of internal combustion engines for automotive vehicles, comprising a coolant pump motor for driving an impeller through the intermediary of a pump shaft, and a valve that is integrated into the pump inlet, wherein the work necessary for switching is afforded by the coolant pump motor and is transmitted to the valve, in particular a 3/2-port directional control valve, via the shaft of the pump motor. The advantages thereby achieved were already discussed above.

In a further preferred embodiment of the method of the invention, the 3/2-port directional control valve includes a rotary valve element having two positions, in particular lock-in positions, namely, switching positions a) "radiator open" or b) "bypass open", and is connected with the pump shaft via a free-wheel, wherein transmission of energy to the rotary valve element through the intermediary of the free-wheel during a rotation of the coolant pump motor in a forward direction is excluded, and transmission of energy takes place in a reverse rotational direction of the coolant pump motor only. The advantages connected herewith were equally already discussed above.

In accordance with a further preferred embodiment of the method, the 3/2-port directional control valve is switched over by rotation, in particular cyclical rotation, of the rotary valve element through a respective angular section of 180 degrees in the reverse rotation direction of the coolant pump motor.

For switching over the 3/2-port directional control valve, in a further preferred embodiment of the inventive method the coolant pump motor running in a forward direction is briefly stopped to then be driven in a reverse rotational direction, again stopped briefly, and finally again operated in the forward running direction. Hereby it is made sure that a clear separation between coolant delivery and switching of the valve position exists. Moreover the valve is switched over in the load-free condition only and accordingly may be actuated even by low switching forces. Furthermore in this way unambiguous switching positions are obtainable in a relatively simple manner.

In a further preferred embodiment of the method, running of the rotor may be monitored, e.g., with the aid of a Hall-effect sensor. Rotor position, rotor angular position, as well as current development may here be monitored with the aid of the already existing electronic unit of the brushless pump motor in order to determine when the rotary valve element has left a particular switching position, in particular lock-in position, and assumed the other one. Feedback of the position of the rotary valve element via the mechanical coupling thereof by means of the free-wheel via the drive shaft to the rotor is here advantageously made use of. For, depending on the switching position and angular position of the rotary valve element, relative facility of rotation of the rotary valve element in the course of switching over, or in turn relative stiffness of rotation upon snapping in or out can be detected. This brings about different voltage/current developments in the stator coils which may be measured and evaluated correspondingly. Thus it is advantageously possible with minimum expense to obtain a determination of the respective position of the rotary valve element with maximum possible accuracy.

In a further preferred embodiment, a coolant volume flow demanded for a particular coolant circulation or coolant throughput is adjusted with the aid of the pump speed of the coolant pump. This provides the advantage of particularly fine regulation of cooling of the vehicle engine in combination with an improved dynamic control behavior without pressure losses in the cooling circuit.

The above described invention shall in the following be explained in more detail by way of exemplary embodiments while making reference to the figures of the drawing, wherein:

FIG. 4 is a three-dimensional view of the inventive combination of pump and valve shown in FIG. 1 to FIG. 3.

Figure 1:
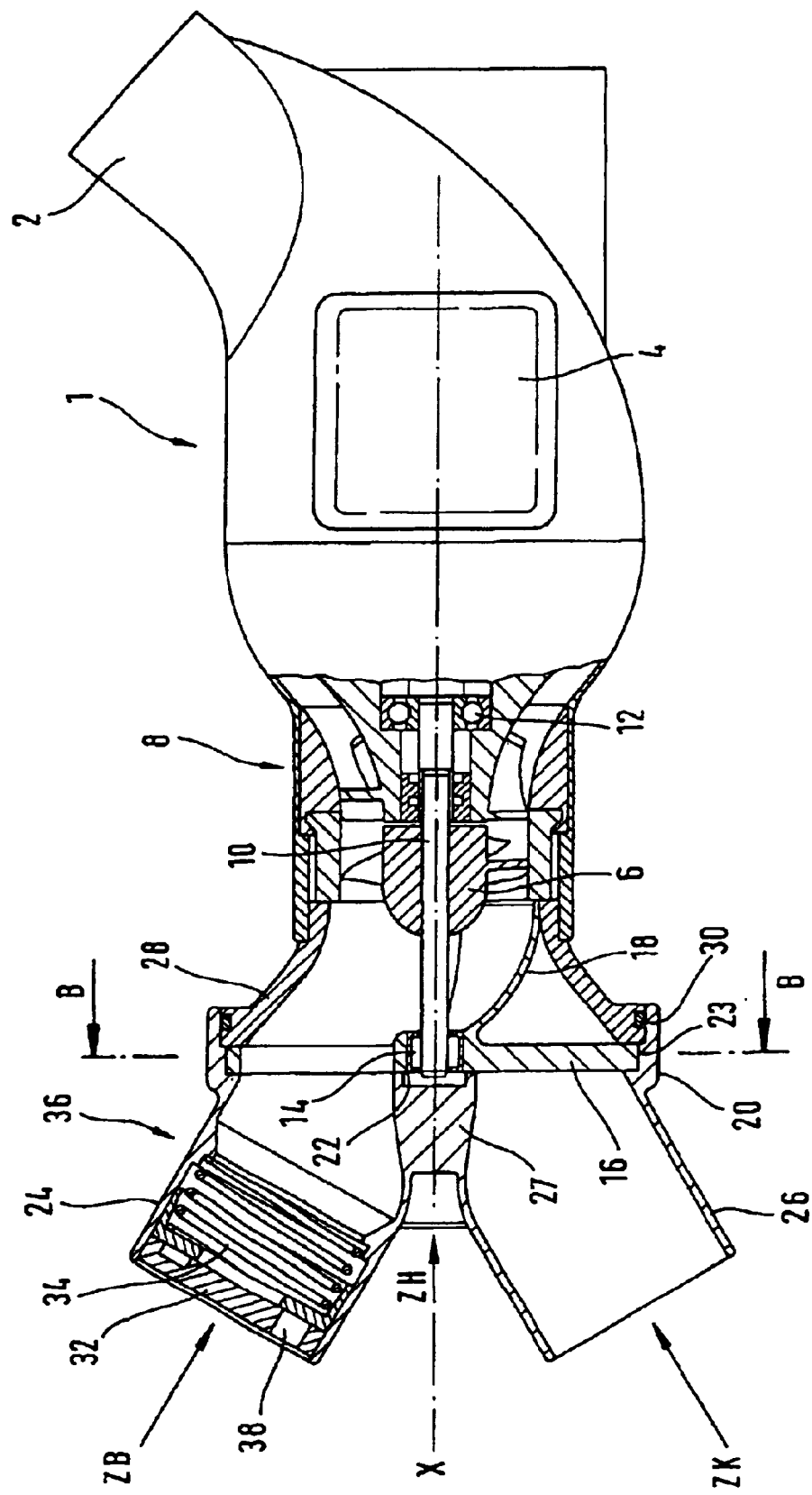
FIG. 1 is a partly cut-open view of an inventive combination of coolant pump and valve.

FIG. 1 shows in a partly cut-open view the inventive combination of an electrical coolant pump with a valve that is integrated into the common housing. The coolant pump 1 includes a drain flange 2 located on the top right in this representation for connecting the conduit (not represented) leading to the internal combustion engine of the automotive vehicle. The housing 4 for the electronic control system of the pump 1, which projects to the outside, is indicated by its external contour.

In the housing range represented in cut-open fashion in the left half of the representation of FIG. 1, the impeller 6 is visible inside the central housing portion 8. The impeller 6 is located on a pump shaft 10 oriented concentrically with respect to the longitudinal axis X pump of the pump. It is driven through the intermediary of a pump motor (not shown). On the right boundary of the range represented in cut-open fashion, a bearing arrangement 12 for mounting the pump shaft 10 is shown. The pump shaft 10 engages a free-wheel 14 with its one end facing away from the pump motor. The free-wheel 14, in turn, is engaged with a valve member having in this preferred embodiment the form of a rotary valve element 16.

The rotary valve element 16 includes flow guide means 18 being represented as having an arcuate section in this FIG. 1 and serving for optimal guidance of the coolant liquid to the impeller 6.

The free-wheel 14 with the pump shaft 10 engaging therein is, in turn, mounted in the valve housing portion 20.

The free-wheel 14 with the pump shaft 10 engaging therein is arranged in a recess of the rotary valve element 16 having the form of a central bore 22, for instance. Mounting of the rotary valve element 16 e.g. having the form of a rotary disc valve is achieved with the aid of correspondingly configured portions or marginal sections 23 at the periphery of the rotary valve element 16. In this way a largely coaxial centered position of the free-wheel 14 relative to the pump shaft 10 is ensured, whereby an inadmissible application of radial forces onto the free-wheel elements of the free-wheel 14 is excluded.

A first inlet flange 24 serving for connection of the conduit arriving from the bypass (not shown) and a second inlet flange 26 serving for connection of the supply conduit from the radiator merge into the valve housing 20 to thus form between each other a centrally arranged gusset 27. The inlet from the bypass is symbolized by arrow ZB. The inlet from the radiator is symbolized by arrow ZK. Moreover in parallel with the longitudinal axis X in the range of the gusset 27, the inlet of the heating return is symbolized by arrow ZH.

The valve housing portion 20 is sealed against the pump housing section 28 accommodating it with the aid of a seal 30. The pump housing section 28, which tapers in a direction toward the center of the pump, opens into the central housing portion 8 of the coolant pump 1.

In the connection flange 24 of the bypass inlet ZB another valve 32 is shown which is biased with the aid of a spring 34 and serves for closing the bypass inlet up to a particular differential pressure. Once this differential pressure is exceeded due to a particular coolant throughput of the pump 1, the valve 32 opens to allow the flow of coolant via the bypass circuit from the bypass of the internal combustion engine of the automotive vehicle through the valve 36 into the pump center of the pump 1, under the condition that the valve is in the "bypass open" position.

Figure 2:
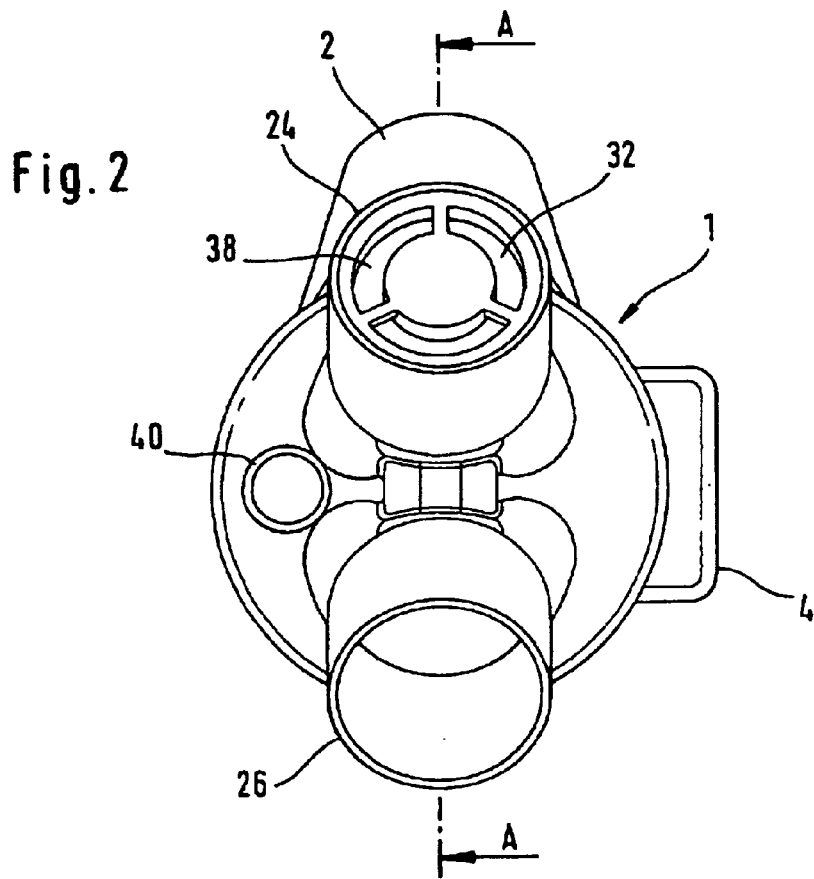
FIG. 2 is a front view of the combination of pump and valve represented from the side in FIG. 1.

In FIG. 2 the inventive combination of pump 1 and valve 36 as represented in FIG. 1 is shown in a lateral view, wherein with regard to FIG. 1 a viewing direction from the left along the longitudinal axis X was selected. In the inlet flange 24 represented to be upwardly open, the particular construction of the additional valve 32, which is biased by a spring not shown in this representation, is illustrated. The valve 32 includes flow passages 38 arranged in the manner of ring segments. Moreover the downwardly directed, continuously open inlet flange 26 for the inlet from the radiator is shown. To the left thereof, on a level with the center plane extending through the longitudinal axis X, the end of the inlet flange 40 for the heating return is shown which faces the viewer. On the right, externally on the housing of the pump 1, the housing cover 4 of the electronic control system is represented. This electronic control system is used jointly for controlling both the pump and the valve. Separate control of the valve is not necessary in the inventive combination of pump and valve. Upwardly to the rear, the margin of the connection flange 2 for the outlet toward the vehicle engine is still partly visible.

Figure 3:
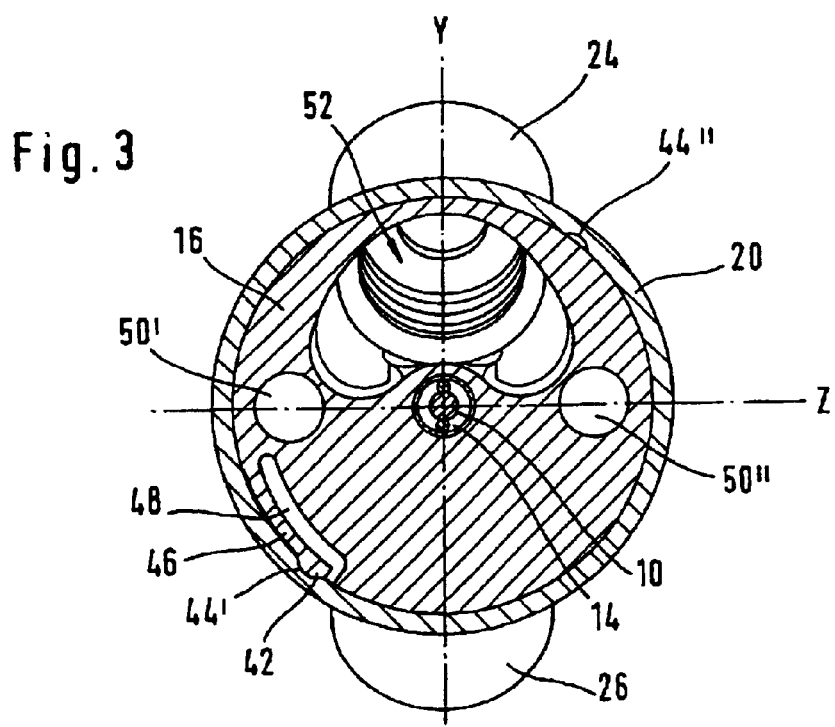
FIG. 3 is an internal view of the valve along the line of section B—B indicated in FIG. 1.

In FIG. 3, a view from inside corresponding to the line of section indicated by arrows B—B when viewing from the right in the direction parallel to the pump longitudinal axis is shown. The cut-open housing 20 of the valve is discernible. The pump longitudinal axis X extends perpendicular to the plane of drawing. In the center of the vertical axis Y and of the lateral axis Z, the end of the pump shaft 10 facing away from the pump motor is shown in sectional view. It is engaged with the free-wheel 14.

In the representation in accordance with FIG. 3 approximately at the bottom left, a nose-type protrusion 42 of the rotary valve element 16 is shown, with this nose-type protrusion 42 locking into a corresponding recess 44' or 44", respectively, in the housing 20. The nose 42 locking into the recess 44' here represents a valve switching position "bypass open", and the nose 42 locking into the opposite recess 44" spaced apart by 180 degrees represents a switching position "radiator open." In order to allow spring-biased snapping of the nose 42 of the rotary valve element 16 into recesses 44' and 44", respectively, similar to a spring-supported latch member, the nose 42 is supported by an arm 46 contained in the contour of the rotary valve element 16, with a slot 48 remaining between the arm 46 and the remaining contour of the rotary valve element 16.

Moreover in FIG. 3 an opening 50' or 50", respectively, is shown which ensures the inlet from the heating return to permanently remain open in each switching position of the valve 36. The opening 52, which in dependence on the switching position clears either the inlet from the bypass or the inlet from the radiator, is optimized in terms of fluid technics in the variant represented here, and in terms of its contour is reminiscent of a hybrid form of reniform and curved triangle. The external ends of the connection flanges for both the inlet of the bypass 24 and the inlet from the radiator 26 are also indicated.

In FIG. 4, the exemplary embodiment of an inventive combination of pump 1 and valve 36 as shown in various views in FIGS. 1 to 3 is shown in a three-dimensional view obliquely from the front. The housing of the pump 1 is closed completely in this representation. Behind the housing portion 4 the common electronic control system for the pump and the valve is concealed. In the covered rear housing portion 54 of the pump 1 the pump motor is concealed, whereas in the forward necking in the central portion 8 the impeller 10 (not shown) is concealed. In front thereof in this representation in accordance with FIG. 4 there is the valve housing portion 20. Facing the viewer to the left there are inlet flanges 24 for the inlet from the bypass and 26 for the inlet from the radiator and also 40 for the inlet from the heating return.

The present invention thus for the first time advantageously creates an electrical coolant pump, in particular for the coolant circuit of internal combustion engines for automotive vehicles, comprising a coolant pump motor for driving an impeller through the intermediary of a pump shaft, and a valve that is integrated into the pump inlet, wherein for the first time the coolant pump motor constitutes the switching element for the valve. Moreover the present invention for the first time specifies a method for controlling the valve, wherein the work necessary for switching is afforded by the coolant pump motor and is transmitted to the valve, in particular a 3/2-port directional control valve, via the shaft of the pump motor.

Moreover in an exemplary variant of the inventive combination of a coolant pump integrated into a housing with a valve, the valve is arranged in the inlet of the electrical axial-flow pump. The valve has the form of a rotary disc valve. Two axial inlets form the connections for radiator return and engine bypass. The rotary disc valve is positioned in the two switching positions a) "radiator open" and b) "bypass open" by two lock-in positions spaced apart by 180 degrees. The switching process is performed by the electronic unit of the pump motor which recognizes the changes in the development of the current which rises so as to overcome a lock-in position. It moreover evaluates the rotary angle signal supplied, e.g., by a Hall-effect sensor of the brushless pump motor. Position recognition may, e.g., also be performed by a current observer, inasmuch as different differential pressures manifest for a) "radiator open" or b) "bypass open" and thus different current values may be observed for a particular reference speed, depending on the switching position. The position value recognized last is stored in a memory. Furthermore the rotary disc valve is rotatably mounted in the circumference of the valve housing portion. The pump motor shaft is prolonged toward the front to establish engagement in a free-wheel. Here the free-wheel in turn is arranged in an internal bore of the rotary valve and drivingly engages the latter in the reverse running direction of the pump motor. In pumping operation, the free-wheel is opened. The shaft rotates while largely free from additional friction. For actuating the valve, the motor is briefly stopped and reversed. Owing to the thermal time constant, this does not have any negative effects in terms of an inadmissible temperature rise of pump motor and/or internal combustion engine. This makes use of the d. c. motor's property of being able to temporarily exert a very high starting torque which is higher than the continuous operation torque by a factor 10.

The inventive combination of a pump with an integrated valve including integrated electronic control componentry is a mechatronic system which constitutes the central unit of a thermomanagement system for future cooling systems. The highly integrated structure together with the assignment of double functions to components results in an extremely compact system exhibiting clear advantages in comparison with known solutions; this also becomes manifest through reduced overall costs.

What is claimed is:

1. An electrical coolant pump (1), in particular for the coolant circuit of internal combustion engines for automotive vehicles, comprising
a coolant pump motor for driving an impeller (6) through the intermediary of a pump shaft (10), and a valve (36) that is integrated into the pump inlet, characterized in that
said coolant pump motor constitutes the switching element for said valve (36), and in that said valve (36) is a 3/2-port directional control valve.

2. The electrical coolant pump (1) in accordance with claim 1, characterized in that said valve (36) includes a flat disc, preferably a rotary valve element (16), as a valve member.

3. The electrical coolant pump (1) in accordance with claim 2, characterized in that said rotary valve element (16) has two positions, in particular lock-in positions, namely, the switching positions a) "radiator open" or b) "bypass open."

4. The electrical coolant pump (1) in accordance with claim 2, characterized in that said rotary valve element (16) is connected to said pump shaft (10) via a free-wheel (14), wherein during a rotation of said coolant pump motor in the forward running direction, said free-wheel (14) excludes transmission of energy to said rotary valve element (16) while permitting transmission of energy in the reverse rotation direction of said coolant pump motor only.

5. The electrical coolant pump (1) in accordance with claim 2, characterized in that said valve (36) may be switched by rotation, in particular cyclical rotation, of said rotary valve element (16) through a respective angular section of 180 degrees in the reverse rotational direction of said coolant pump motor.

6. The electrical coolant pump (1) in accordance with claim 2, characterized in that said rotary valve element (16) includes flow guide means (18).

7. The electrical coolant pump (1) in accordance with claim 1, characterized in that said 3/2-port directional control valve comprises in its housing portion (20) another inlet (ZH; 40) from the heating return, which inlet in particular is permanently open.

8. The electrical coolant pump (1) in accordance with claim 1, characterized in that said coolant pump control unit is at the same time provided for controlling said 3/2-port directional control valve.

9. The electrical coolant pump (1) in accordance with claim 3, characterized in that the direction of flow of coolant (ZK) arriving from said radiator encloses with said coolant pump longitudinal axis (X) an angle of less than 40°, preferably less than 30°.

10. The electrical coolant pump (1) in accordance with claim 3, characterized in that the direction of flow of coolant (ZB) arriving from said bypass encloses with said coolant pump longitudinal axis (X) an angle of less than 40°, preferably less than 30°.

11. The electrical coolant pump (1) in accordance with any one of claim 3, characterized in hat the inlet of said bypass (24) of said 3/2-port directional control valve includes an additional valve (32) which is biased, preferably spring biased.

12. The electrical coolant pump (1) in accordance with claim 1, characterized in that said rotary valve element (16) has two positions, in particular lock-in positions, namely, the switching positions a) "radiator open" or b) "bypass open."

13. A method for controlling a valve (36) of an electrical coolant pump (1), in particular for the coolant circuit of internal combustion engines for automotive vehicles, comprising
a coolant pump motor for driving an impeller (6) through the intermediary of a pump shaft (10), and
a valve (36) that is integrated into the pump inlet, and constitutes a switching element for said valve (36) characterized in that the work necessary for switching is afforded by said coolant pump motor and is transmitted to said valve (36), in particular a 3/2-port directional control valve, via said shaft (10) of said pump motor.

14. The method in accordance with claim 13 characterized in that said 3/2-port directional control valve comprises a rotary valve element (16) having two positions, in particular lock-in positions, namely, the switching positions
a) "radiator open" or b) "bypass open", and is connected with said pump shaft (10) via a free-wheel (14), wherein transmission of energy to said rotary valve element (16) through the intermediary of said free-wheel (14) is excluded during a rotation of said coolant pump motor in a forward running direction, and transmission of energy takes place in a reverse rotational direction of said coolant pump motor only.

15. The method in accordance with claim 13, characterized in that said 3/2-port directional control valve (36) is switched over by rotation, in particular cyclical rotation, of said rotary valve element (16) through a respective angular section of 180° in the reverse rotation direction of said coolant pump motor.

16. The method in accordance with any one of claims 15, characterized in that for switching over said 3/2-port directional control valve (36), said coolant pump motor running in a forward running direction is briefly stopped to then be driven in a reverse rotation direction, again stopped briefly, and finally again operated in the forward running direction.

17. The method in accordance with any one of claim 14, characterized in that rotor position, rotor angular position, and current development are monitored with the aid of the existing electronic unit of said brushless pump motor, whereby it is determined when said rotary valve element (16) has left a particular switching position, in particular lock-in position, and assumed the other switching position.

18. The method in accordance with claim 13 characterized in that a coolant volume flow demanded for a particular coolant circulation is adjusted with the aid of the pump speed of said coolant pump.

* * * * *